United States Patent Office 2,822,316
Patented Feb. 4, 1958

2,822,316

ESTRONE SOLUTIONS CONTAINING ETHYL LACTATE AND CASTOR OIL

Hans Richter, Berlin-Steglitz, Germany, assignor to Schering, A. G., Berlin, Germany No Drawing. Application October 13, 1955
Serial No. 540,357

Claims priority, application Germany October 19, 1954

5 Claims. (Cl. 167—74)

The present invention relates to oily solutions of estrone, and more particularly to oily estrone solutions having a relatively high concentration of estrone and being stable at room temperature.

Oily solutions of estrone for intramuscular injection of this hormone have been known for many years. However, for most purposes, the suitable hormone concentration of these solutions is insufficient due to the relatively low solubility of the estrone, particularly at room temperature, in all the known oily solvents suitable for injection purposes.

It is therefore a primary object of the present invention to provide oily estrone solutions which are stable at room temperature and in which the estrone is dissolved in relatively high concentration, which oily solutions are suitable for intramuscular injection purposes.

It is another object of the present invention to provide an improved estrone composition for intramuscular injection.

Other objects and advantages of the present invention will be apparent from a further reading of the specification and of the appended claims.

With the above objects in view, the present invention mainly comprises as a new composition, an oily solution of estrone stable at room temperature, the solution consisting essentially of estrone dissolved in a solvent selected from the group consisting of ethyl lactate and mixtures of ethyl lactate and castor oil consisting of at least 10% by volume of ethyl lactate.

According to the present invention, ethyl lactate may be used alone as the solvent for the estrone. The solubility of estrone in ethyl lactate at 20° C. is about 7 mg. per cc.

According to a preferred embodiment of the present invention, a mixture of ethyl lactate and castor oil in which ethyl lactate constitutes at least 10% by volume of the mixture may be utilized as the solvent for the estrone. Most preferably, a mixture of equal parts by volume of castor oil and ethyl lactate is used as the solvent for the estrone. This mixture of equal parts by volume of castor oil and ethyl lactate can dissolve up to 5.1 mg. per cc. of estrone at 20° C. Contrary thereto, the solubility of estrone in sesame oil is only below 0.5 mg. per cc. at a temperature of 20° C.

The estrone solutions of the present invention should preferably contain at least 3.5 mg. of estrone per cc., since it is preferred, and it is an advantage of the present invention, to utilize solutions which have a concentration of estrone which is as high as possible. When ethyl lactate is used alone as the solvent, the concentration of estrone in the solution is preferably between 3.5 and 7 mg. per cc. When a mixture of equal parts by volume of castor oil and ethyl lactate is used as the solvent, the concentration of estrone is preferably between 3.5 and 5.1 mg. per cc. Preferably slightly less than the maximum concentration at 20° C. of estrone in the ethyl lactate or in the mixture of ethyl lactate and castor oil is used in order to prevent crystallizing-out of the estrone upon storage of the solution under refrigeration.

The following examples are given to further illustrate the present invention, the scope of the invention not however being limited to the specific details of the examples.

Example 1

Estrone is dissolved in ethyl lactate in an amount such that the solution contains 3.5 mg. of estrone per cc. of ethyl lactate. The solution may be used for intramuscular injection of estrone, the amount of solution used for each injection depending upon the desired amount of estrone to be given to the patient.

Example 2

Estrone is dissolved in a mixture consisting of 10% by volume of ethyl lactate and 90% by volume of castor oil in an amount such that the resulting solution contains 3.5 mg. of estrone per cc. The solution may be used for intramuscular injection purposes.

Example 3

Estrone is dissolved in a mixture consisting of 90% by volume of ethyl lactate and 10% by volume of castor oil in an amount such that the resulting solution contains 5.5 mg. of estrone per cc. The solution may be used for intramuscular injections.

Example 4

Estrone is dissolved in ethyl lactate in an amount of 6.8 mg. of estrone per cc. The solution may be used for intramuscular injections.

Example 5

Estrone is dissolved in a mixture consisting of equal parts by volume of ethyl lactate and castor oil in an amount such that the resulting solution contains 4.8 mg. of estrone per cc.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. As a new composition of matter, a solution of estrone stable at room temperature, said solution consisting essentially of estrone dissolved in ethyl lactate in an amount of 3.5–7 mg. per cc.

2. As a new composition of matter, an oily solution of estrone stable at room temperature, said solution consisting essentially of estrone dissolved in a mixed solvent consisting of about 50% by volume ethyl lactate and 50% by volume of castor oil.

3. A composition according to claim 2 in which the concentration of estrone in said solution is between 3.5 and 5.1 mg. per cc.

4. As a new composition of matter, a solution of estrone stable at room temperature, said solution consisting essentially of estrone dissolved in a solvent consisting of between 10–100% by volume of ethyl lactate and between 90–0% by volume of castor oil, said estrone being dissolved in said solvent in an amount between 3.5 mg. per cc. and the maximum amount of estrone soluble in said solvent at 20° C.

5. As a new composition of matter, a solution of estrone stable at room temperature, said solution consisting essentially of estrone dissolved in a solvent consisting of a mixture of castor oil and at least 10% by volume of ethyl lactate, said estrone being dissolved in said solvent in an amount between 3.5 mg. per cc. and the maximum amount of estrone soluble in said solvent at 20° C.

References Cited in the file of this patent

UNITED STATES PATENTS 2,661,315    Jurist            Dec. 1, 1953

FOREIGN PATENTS 307,054    Great Britain        Jan. 25, 1929